United States Patent
Matsumoto et al.

(10) Patent No.: US 7,633,565 B2
(45) Date of Patent: Dec. 15, 2009

(54) TOUCH PANEL AND METHOD OF MANUFACTURING THE SAME

(75) Inventors: Kenichi Matsumoto, Osaka (JP); Tetsuo Murakami, Osaka (JP); Toshiharu Fukui, Nara (JP)

(73) Assignee: Panasonic Corporation, Osaka (JP)

( * ) Notice: Subject to any disclaimer, the term of this patent is extended or adjusted under 35 U.S.C. 154(b) by 697 days.

(21) Appl. No.: 10/855,520

(22) Filed: May 28, 2004

(65) Prior Publication Data

US 2004/0257344 A1 Dec. 23, 2004

(30) Foreign Application Priority Data

Jun. 18, 2003 (JP) ............... 2003-173176

(51) Int. Cl.
*G02F 1/1335* (2006.01)

(52) U.S. Cl. ....................................... 349/12

(58) Field of Classification Search ........................ None
See application file for complete search history.

(56) References Cited

U.S. PATENT DOCUMENTS 6,559,902 B1 * 5/2003 Kusuda et al. ................ 349/12

2003/0096086 A1 5/2003 Matsumoto et al.
2003/0175507 A1 * 9/2003 Ikeda et al. .................. 428/343

FOREIGN PATENT DOCUMENTS

CN 1417820 5/2003
JP 4-123728 4/2002

* cited by examiner

*Primary Examiner*—David Nelms
*Assistant Examiner*—Lucy P Chien
(74) *Attorney, Agent, or Firm*—Wenderoth, Lind & Ponack, L.L.P.

(57) ABSTRACT

An upper substrate that has upper conductive layer formed on a bottom surface thereof, is bonded to lower substrate, that has lower conductive layer opposed to the upper conductive layer with a predetermined space held therebetween, on a top surface of lower substrate by an adhesive layer that is made of a thermoplastic resin containing a tackifier dispersed therein, with a bonding property of the adhesive layer being enhanced by pressing. Addition of the tackifier increases flexibility of the adhesive layer and performs bonding with a large adhesive area at pressing. Thus, a width of the adhesive layer can be as small as approximately 1 to 1.5 mm. This can provide a smaller touch panel ensuring a predetermined touch sensitive area.

16 Claims, 1 Drawing Sheet

TOUCH PANEL AND METHOD OF MANUFACTURING THE SAME

FIELD OF THE INVENTION

The present invention relates to a touch panel used for an input operation in various kinds of electronic equipment and a method of manufacturing the touch panel.

BACKGROUND OF THE INVENTION

As electronic equipment has had more advanced and diversified functions in recent years, an increasing number of such equipment has an optically transparent touch panel attached in front of liquid crystal display elements so that characters, marks, and icons displayed on the display elements are recognized and selected through the touch panel, and individual functions of the equipment are switched by depressing the touch panel with a finger, or a touch screen pen.

Such a conventional touch panel is described with reference to FIG. 2. To facilitate understanding of a structure thereof, a dimension in a direction of thickness is enlarged in this figure.

As shown in FIG. 2, a conventional touch panel has optically transparent upper substrate 1 made of polyethylene terephthalate film or polycarbonate film. On a bottom surface of the upper substrate, optically transparent upper conductive layer 2 made of indium tin oxide or tin oxide is formed by vacuum sputtering or other methods.

On a top surface of optically transparent lower substrate 3 made of polyethylene terephthalate resin, glass or acrylic resin, optically transparent lower conductive layer 4 is formed. On a top surface of lower conductive layer 4, a plurality of dot spacers 5 made of epoxy resin or silicon resin, are formed to hold a predetermined space between upper conductive layer 2 and lower conductive layer 4.

Moreover, at both ends of upper conductive layer 2, a pair of upper electrodes 6 is formed. On the other hand, at both ends of lower conductive layer 4, a pair of lower electrodes 7 is formed. The pair of upper electrodes 6 and the pair of lower electrode layers 7 are orthogonal to each other. In the description of FIG. 2, by routing either upper electrode 6 or lower electrode 7, both electrodes are configured to oppose each other at the same end. Each of upper electrodes 6 and lower electrodes 7 is formed by printing paste made of silver, carbon, or other materials. These electrodes are covered with upper insulating layer 8 or lower insulating layer 9 made of polyester resin.

Further, outer peripheries of these upper substrate 1 and lower substrate 3 are bonded by a frame-shaped spacer 10 so that upper conductive layer 2 and lower conductive layer 4 are opposed to each other with a predetermined space held therebetween. Thus, the touch panel is structured. Frame-shaped spacer 10 is structured so that adhesive layers 10B are applied to top and bottom surfaces of base 10A made of polyethylene terephthalate film.

In a thus structured touch panel, upper lead electrodes 6 and lower lead electrodes 7 are connected to a detecting circuit (not shown) of electronic equipment. Depressing a touch sensitive area, in which a depressing operation and position-detecting operation are possible with a finger or pen, flexes upper substrate 1 and brings upper conductive layer 2 in a depressed position into contact with lower conductive layer 4. Voltages are sequentially applied to upper electrodes 6 and lower electrodes 7 by the detecting circuit. The detecting circuit detects the depressed position according to a resistance ratio of these pairs of upper electrodes 6 and lower electrodes 7.

Incidentally, the touch sensitive area does not include spacer 10 formed on the top surface of upper substrate 1. Spacer 10 is structured so that adhesive layers 10B are applied to the top and bottom surfaces of base 10A as described above. Thus, even when a width of the spacer is small to a certain degree, a predetermined adhesive strength can be obtained. However, when a width of the spacer is extremely small, a cutting or bonding operation is difficult. For this reason, the width is generally set to approximately 2.5 mm.

When adhesive layer 10B is directly printed on one of upper substrate 1 and lower substrate 3 without using spacer 10, the width of the adhesive layer can be made smaller. However, to obtain a predetermined adhesive strength, a width of not less than 2.5 mm is necessary. Moreover, because upper substrate 1 and lower substrate 3 must be bonded by a hot press, heat at pressing may cause warps or undulations of upper substrate 1 or lower substrate 3.

In either case, a thermoplastic resin having adhesive properties even at room temperature is used in adhesive layer 10B. Thus, a predetermined width of the adhesive layer can provide a predetermined adhesive strength at room temperature. However, when the touch panel is used under high temperatures and high humidity, the adhesive strength is smaller than that at room temperature, and thus so-called holding strength deteriorates. For this reason, actually, the adhesive layer must have a width exceeding 2.5 mm.

The conventional touch panel described above requires adhesive layer 10B having a width exceeding 2.5 mm to ensure a predetermined adhesive strength between upper substrate 1 and lower substrate 3 for use under high temperatures and high humidity. For this reason, the conventional touch panel has the following problem. Because this wider adhesive layer reduces a touch sensitive area in which a depressing operation and position-detecting operation are possible, and because an outside dimension measures a predetermined touch sensitive area plus a width of spacer 10, the touch panel in its entirety becomes large.

SUMMARY OF THE INVENTION

A touch panel of the present invention is structured so that an upper substrate, that has an upper conductive layer formed on a bottom surface thereof, is bonded to a lower substrate, that has a lower conductive layer opposed to the upper conductive layer with a predetermined space held therebetween, by an adhesive layer. The adhesive layer is made of an adhesive material that contains a thermoplastic resin containing a tackifier dispersed therein, and a bonding property of the adhesive material is enhanced by pressing. Addition of the tackifier increases flexibility of the adhesive layer and performs bonding with an adhesive area substantially increased by pressing. Thus, a width of the adhesive layer can be as small as approximately 1 to 1.5 mm. This can provide a smaller touch panel ensuring a predetermined touch sensitive area.

A method of manufacturing a touch panel of the present invention has a step of bonding the touch panel, using the adhesive material, by pressing.

DETAILED DESCRIPTION OF THE PREFERRED EMBODIMENTS

Figure 1:
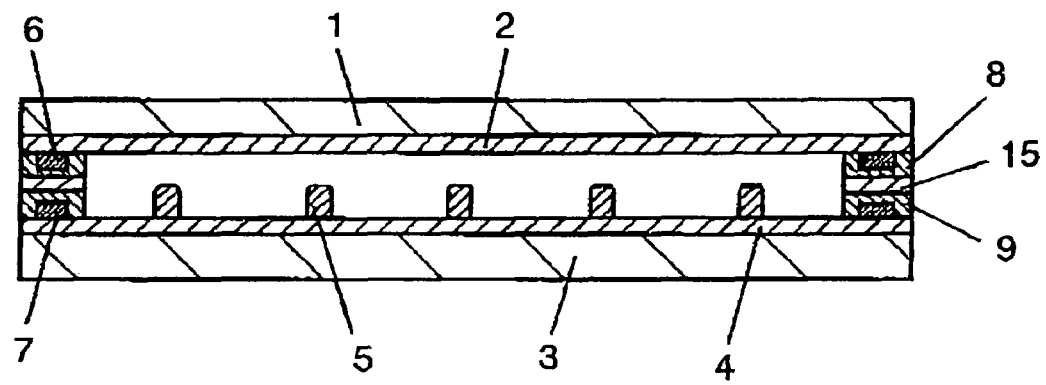
FIG. 1 is a sectional view of a touch panel in accordance with an exemplary embodiment of the present invention.

An exemplary embodiment of the present invention is described hereinafter with reference to FIG. 1. In this description, same elements used in the prior art are denoted with the same reference numbers and a detailed description of these elements is omitted. To facilitate understanding of a structure thereof, a dimension in a direction of a thickness is enlarged in the figures.

EXEMPLARY EMBODIMENT

A touch panel of an exemplary embodiment of the present invention is described with reference to FIG. 1. A touch panel of this embodiment has optically transparent upper substrate 1 that is made of polyethylene terephthalate film, polycarbonate film, or the like, and has a thickness ranging from approximately 150 to 200 μm. On a bottom surface of the upper substrate, optically transparent upper conductive layer 2 made of indium tin oxide, tin oxide, or other conductive materials, is formed by vacuum sputtering or another forming method. On the other hand, on a top surface of optically transparent lower substrate 3 made of polyethylene terephthalate resin, glass, or acrylic resin, optically transparent lower conductive layer 4 is formed. On a top surface of lower conductive layer 4, a plurality of dot spacers 5 made of an insulating resin, e.g. epoxy polymer and silicon polymer, are formed at predetermined intervals. Dot spacers 5 serve to hold a predetermined space between upper conductive layer 2 and lower conductive layer 4.

Moreover, at both ends of upper conductive layer 2, a pair of upper electrodes 6 is formed. On the other hand, at both ends of lower conductive layer 4, a pair of lower electrodes 7 is formed. The pair of upper electrodes 6 and the pair of lower electrode layers 7 are positioned at orthogonal ends. However, in the description of FIG. 1, by routing either upper electrode 6 or lower electrode 7, both electrodes are opposed to each other at the same end. Each of upper electrodes 6 and lower electrodes 7 is formed by printing paste made of silver, carbon, or other conductive materials. These electrodes are covered with upper insulating layer 8 or lower insulating layer 9 made of polyester or other materials.

Adhesive layer 15, an important element of the present invention, is a type of an adhesive layer of which a bonding property is enhanced by pressing. Used in this embodiment is an adhesive material in which 1 to 35 grams of a tackifier made of a thermoplastic oligomer is dispersed in 100 grams of a thermoplastic resin, e.g. acrylic resin and polyester resin.

Adhesive layer 15 is formed in a frame shape along an outer periphery of upper insulating layer 8 or lower insulating layer 9 in thickness of 5 to 50 μm. Appropriately, an elastic modulus of the adhesive material made of a thermoplastic resin containing a tackifier dispersed therein is set to $10^3$ to $10^8$ Pa. Outer peripheries of upper substrate 1 and lower substrate 3 are bonded by this adhesive layer 15 so that upper conductive layer 2 and lower conductive layer are opposed to each other with a predetermined space held therebetween. Thus, the touch panel is configured.

Next, a method of manufacturing a thus structured touch panel is described.

First, after an adhesive material including a solvent is screen-printed on lower insulating layer 9 along the outer periphery of lower substrate 3, solvent is evaporated. Thus, frame-shaped adhesive layer 15 approximately 1 to 1.5 mm wide is formed.

Then, upper substrate 1 is placed on lower substrate 3 so that upper conductive layer 2 is opposed to lower conductive layer 4 with a predetermined space held therebetween. Adhesive layer 15 along the outer peripheries of upper substrate 1 and lower substrate 3 are pressed to bond upper substrate 1 and lower substrate 3 together. Thus, a touch panel is completed.

Adhesive layer 15 made of a thermoplastic resin contains a tackifier dispersed therein, and the tackifier increases flexibility of the adhesive layer. Thus, bonding is performed with an adhesive area substantially increased by pressing. For this reason, adhesive layer 15 as small as approximately 1 to 1.5 mm can provide a sufficient adhesive strength.

Upper electrodes 6 and lower electrodes 7 of this produced touch panel are connected to a detecting circuit (not shown) of electronic equipment. Depressing a position other than adhesive layer 15 on the top surface of upper substrate 1, i.e. a touch sensitive area in which a depressing operation and position-detecting operation are possible, with a finger, pen, or the like, flexes upper substrate 1 and brings upper conductive layer 2 in a depressed position into contact with lower conductive layer 4. On the other hand, voltages are sequentially applied to upper electrodes 6 and lower electrodes 7 by the detecting circuit. The detecting circuit detects the depressed position according to resistance ratios of these pairs of upper electrodes 6 and lower electrodes 7.

As described above, a touch panel of the present invention is made of a thermoplastic resin containing tackifier dispersed therein. Also, upper substrate 1 and lower substrate 3 are bonded by adhesive layer 15 of which a bonding property is enhanced by pressing. Addition of the tackifier increases flexibility of adhesive layer 15 and performs bonding with an adhesive area substantially increased at pressing. Thus, the width of the adhesive layer can be as small as approximately 1 to 1.5 mm. This can realize a smaller touch panel ensuring a predetermined touch sensitive area, and a method of manufacturing the touch panel.

Moreover, printing this adhesive layer 15 on at least one of upper substrate 1 and lower substrate 3 eliminates a base of usual spacer 10 to which adhesive layers are applied on top and bottom surfaces thereof. This can reduce a number of constituent components and make the touch panel less expensive.

Preferably, a thickness of adhesive layer 15 ranges from 5 to 50 μm. This thickness ensures a sufficient space between the upper and lower conductive layers. With this thickness, a flexure stress created on upper conductive layer 2 when the vicinity of adhesive layer 15 is depressed is smaller than that caused by a thicker adhesive layer. Thus, breakage of upper conductive layer 2 can be prevented.

An elastic modulus of adhesive layer 15 can be adjusted according to a kind and polymerization degree of the thermoplastic resin and a kind and composition ratio of the tackifier added thereto. To attain the object of the present invention, it is preferable that an elastic modulus of adhesive layer 15 ranges from $10^3$ to $10^3$ Pa. Adhesive layer 15 in this range of the elastic modulus can prevent the following problems. Too soft adhesive layer 15 cannot provide a sufficient adhesive strength and upper substrate 1 and lower substrate 3 may peel off easily. Too hard adhesive layer 15 may make it difficult for substrate 1 and lower substrate 3 to adhere to each other.

Preferably, a thermoplastic resin for use in adhesive layer 15 is selected from at least one of acrylic resin and polyester resin. Acryl polyol and polyester polyol have a larger number of reactive functional groups than other urethane polyol, and thus a crosslink density thereof can be increased. For this reason, in addition to adhesive strength at room temperature, holding strength at high temperatures can be improved.

As a tackifier for use in adhesive layer 15, thermoplastic oligomers are preferable. Additionally, it is preferable to disperse 1 to 35 gram of a thermoplastic oligomer in 100 gram of a thermoplastic resin. For example, terpene resin or the like is used as a thermoplastic oligomer. Terpene resin has excellent compatibility with thermoplastic resin, a main component.

Moreover, heat resistance, weathering resistance, and adhesion properties with respect to this adherent can be improved.

Thermoplastic oligomers include modified terpene resin, terpene phenol resin and hydrogenated cyclic polymer in addition to the terpene resin. Terpene resin complying with the isoprene rule is especially preferable.

Figure 2:
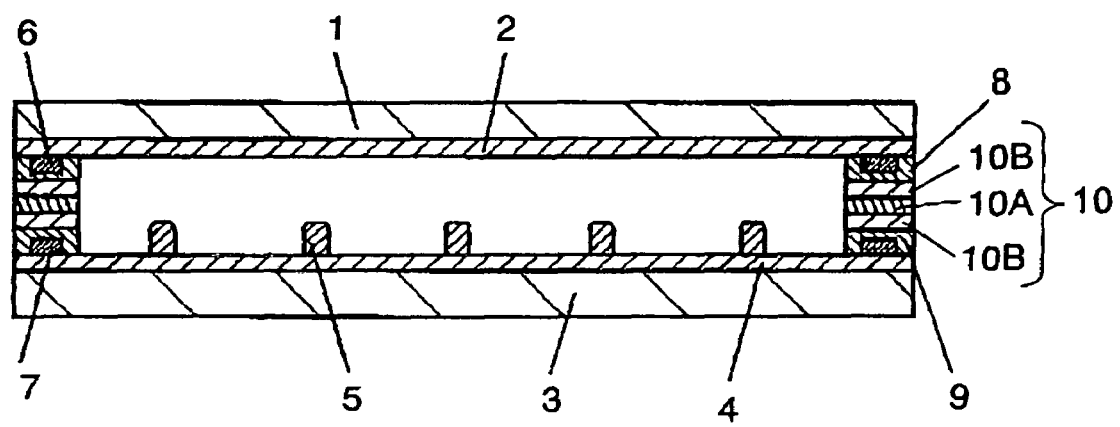
FIG. 2 is a sectional view of a conventional touch panel.

In this embodiment, an adhesive composition in which 20 grams of a terpene resin is dispersed in 100 grams of an acrylic resin is used to produce a touch panel. An elastic modulus of the adhesive composition used measures $1 \times 10^5$ Pa. Adhesive layer 15, 1.0 mm wide and 30 μm thick, is formed by printing the adhesive composition, mixed in a solvent mainly containing butyl carbitol, by performing a screen-printing method on lower substrate 9, and then by drying. A shelf test of the adhesion properties of a produced touch panel in high temperatures and high humidity showed no failure. On the other hand, a shelf test of the conventional touch panel shown in FIG. 2 having a 1.0-mm-wide spacer 10 under the same conditions caused peeling in a part of a bonded position after tests.

In another embodiment of the present invention, an isocyanate-containing curing agent is added to adhesive layer 15, and 1 to 20 grams of this curing agent is dispersed in 100 grams of a thermoplastic resin. For example, when the thermoplastic resin, a main component, is a polyurethane resin, addition of the isocyanate-containing curing agent causes a dehydration reaction, thereby forming urethane bonds having large cohesive energy. In other words, the curing reaction cross-links resins, and an adhesive layer having a high crosslink density is formed. For this reason, in addition to adhesive strength at room temperature, holding strength at high temperatures is improved. As a result, the width of adhesive layer 15 can be as small as approximately 0.5 to 1.5 mm.

In the above description, acrylic resin or polyester resin is used as a thermoplastic resin in adhesive layer 15. However, the present invention can be implemented by using other resins, e.g. thermoplastic resin, such as epoxy resin modified by acrylic resin or polyester resin.

In the above description, only adhesive layer 15 without a base is provided between the upper and lower substrates. However, adhesive layers 15 can be applied to top and bottom surfaces of a base made of unwoven fabric, polyester film, or the like.

As described above, the present invention can provide a smaller touch panel ensuring a predetermined touch sensitive area, and a method of manufacturing the touch panel.

What is claimed is:

1. A touch panel comprising:
   an upper substrate having an upper conductive layer on a bottom surface thereof;
   a lower substrate having a lower conductive layer thereon, said lower conductive layer being opposed to said upper conductive layer with a predetermined space therebetween; and
   an adhesive layer bonding said upper substrate and said lower substrate to one another, said adhesive layer including an adhesive material having a thermoplastic resin and a tackifier,
   wherein said adhesive layer has an elastic modulus ranging from $10^3$ Pa to $10^8$ Pa, and
   wherein said tackifier comprises a thermoplastic oligomer, and said adhesive material contains 1 gram to 35 grams of said tackifier in 100 grams of said thermoplastic resin.

2. The touch panel according to claim 1, wherein said thermoplastic resin contains at least one of acrylic resin and polyester resin.

3. The touch panel according to claim 2, wherein said adhesive material includes 1 gram to 20 grams of an isocyanate-containing curing agent dispersed in 100 grams of said thermoplastic resin.

4. The touch panel according to claim 1, wherein said adhesive layer is 1.0 mm to 1.5 mm wide.

5. The touch panel according to claim 1, wherein said adhesive layer is 5 μm to 50 μm thick.

6. The touch panel according to claim 1, wherein said thermoplastic resin comprises at least one of acrylic resin and polyester resin.

7. The touch panel according to claim 1, wherein said adhesive material contains 1 gram to 20 grams of an isocyanate-containing curing agent dispersed in 100 grams of said thermoplastic resin.

8. The touch panel according to claim 1, wherein said adhesive layer is 1.0 mm to 1.5 mm wide, and 5 μm to 50 μm thick; and
said thermoplastic resin contains at least one of acrylic resin and polyester resin.

9. A method of manufacturing a touch panel comprising:
   printing an adhesive layer onto at least one of an upper substrate and a lower substrate, said upper substrate having an upper conductive layer on a bottom surface thereof and said lower substrate having a lower conductive layer thereon, and said adhesive layer including an adhesive material having a thermoplastic resin and a tackifier, with a bonding property of said adhesive material being enhanced by pressing;
   opposing said upper substrate with said lower substrate such that said lower conductive layer is opposed to said upper conductive layer with a predetermined space therebetween; and
   bonding said upper substrate and said lower substrate to one another by pressing said adhesive layer,
   wherein said adhesive layer has an elastic modulus ranging from $10^3$ Pa to $10^8$ Pa, and
   wherein said tackifier comprises a thermoplastic oligomer, and said adhesive material contains 1 gram to 35 grams of said tackifier in 100 grams of said thermoplastic resin.

10. The method of manufacturing a touch panel according to claim 9, wherein
said thermoplastic resin contains at least one of acrylic resin and polyester resin.

11. The method of manufacturing a touch panel according to claim 10, wherein
said adhesive material includes 1 gram to 20 grams of an isocyanate-containing curing agent dispersed in 100 grams of said thermoplastic resin.

12. The method according to claim 9, wherein
said adhesive layer is 1.0 mm to 1.5 mm wide.

13. The method according to claim 9, wherein
said adhesive layer is 5 μm to 50 μm thick.

14. The method according to claim 9, wherein
said thermoplastic resin comprises at least one of acrylic resin and polyester resin.

15. The method according to claim 9, wherein
said adhesive material contains 1 gram to 20 grams of an isocyanate-containing curing agent dispersed in 100 grams of said thermoplastic resin.

16. The method according to claim 9, wherein
said adhesive layer is 1.0 mm to 1.5 mm wide, and 5 μm to 50 μm thick; and
said thermoplastic resin contains at least one of acrylic resin and polyester resin.

* * * * *

UNITED STATES PATENT AND TRADEMARK OFFICE
CERTIFICATE OF CORRECTION

PATENT NO. : 7,633,565 B2  Page 1 of 1
APPLICATION NO. : 10/855520
DATED : December 15, 2009
INVENTOR(S) : Kenichi Matsumoto et al.

It is certified that error appears in the above-identified patent and that said Letters Patent is hereby corrected as shown below:

Title page, item (56) References Cited, under the "FOREIGN PATENT DOCUMENTS" heading, the publication date "4/2002" for JP 4-123728 should read --4/1992--.

Signed and Sealed this

Sixteenth Day of March, 2010

David J. Kappos
*Director of the United States Patent and Trademark Office*